United States Patent
Matsumoto et al.

(10) Patent No.: US 8,813,556 B2
(45) Date of Patent: Aug. 26, 2014

(54) INTAKE TEMPERATURE SENSOR

(75) Inventors: Masahiro Matsumoto, Hitachi (JP); Hiroshi Nakano, Tokai (JP); Keiji Hanzawa, Mito (JP); Satoshi Asano, Hitachi (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 185 days.

(21) Appl. No.: 13/337,398

(22) Filed: Dec. 27, 2011

(65) Prior Publication Data

US 2012/0160024 A1    Jun. 28, 2012

(30) Foreign Application Priority Data

Dec. 28, 2010  (JP) .................................. 2010-291534

(51) Int. Cl.
 *G01F 1/68* (2006.01)
(52) U.S. Cl.
 USPC ...................................................... 73/204.11
(58) Field of Classification Search
 USPC ........................................ 73/204.26–204.28
 See application file for complete search history.

(56) References Cited

U.S. PATENT DOCUMENTS

| | | | |
|---|---|---|---|
| 4,911,008 A * | 3/1990 | Casey ........................... | 73/202.5 |
| 6,516,785 B1 | 2/2003 | Nakada et al. | |
| 6,552,441 B1 | 4/2003 | Gander | |
| 6,782,744 B1 * | 8/2004 | Tashiro et al. ............. | 73/204.22 |
| 6,845,661 B2 * | 1/2005 | Bogdanov et al. .......... | 73/204.22 |
| 7,255,837 B2 * | 8/2007 | Abe et al. .................... | 73/204.22 |
| 7,360,415 B2 * | 4/2008 | Nakano et al. .............. | 73/204.26 |
| 7,712,361 B2 * | 5/2010 | Uramachi .................... | 73/204.22 |
| 8,448,508 B2 * | 5/2013 | Schneider et al. .......... | 73/204.26 |
| 2006/0112763 A1 | 6/2006 | Uramachi et al. | |
| 2009/0000366 A1 | 1/2009 | Uramachi | |

FOREIGN PATENT DOCUMENTS

| | | |
|---|---|---|
| DE | 195 04 572 | 8/1996 |
| DE | 198 02 045 | 7/1999 |
| DE | 199 05 384 | 8/2000 |
| EP | 1 988 554 | 11/2008 |
| JP | 2009-008619 | 1/2009 |
| WO | WO02/10694 | 2/2002 |

* cited by examiner

*Primary Examiner* — Jewel V Thompson
(74) *Attorney, Agent, or Firm* — Antonelli, Terry, Stout & Kraus, LLP.

(57) ABSTRACT

An intake temperature sensor capable of precisely detecting the temperature of intake at high speed even in a low air mass flow zone is provided. In an intake temperature sensor having a temperature detecting element 6 inserted in an opening provided in an intake pipe 3 to be disposed in the intake pipe, a temperature detecting element is mechanically joined with a heat sink 4 directly exposed to the flow of the intake flowing in the intake pipe, and the temperature of the intake is output based on an output obtained from the temperature detecting element. Thus, the thermal resistance of the temperature detecting element with respect to the intake flow can be reduced; therefore, the intake temperature sensor capable of precisely detecting the temperature of the intake at high speed even in the low air mass flow zone can be provided.

14 Claims, 15 Drawing Sheets

INTAKE TEMPERATURE SENSOR

BACKGROUND OF THE INVENTION

1. Field of the Invention

The present invention relates to an intake temperature sensor and particularly relates to an intake temperature sensor exhibiting high measurement accuracy at a low air mass flow and exhibiting good responsiveness.

2. Background Art

Conventional intake temperature sensors that detect the temperature of the intake in an intake pipe include an air mass flow measuring device described in JP Patent Application Publication No. 2009-8619 and a thermal-type air mass flow meter described in WO02/010694.

In JP Patent Application Publication No. 2009-8619, an intake-temperature detecting element is disposed so as to be directly exposed to an intake flow by utilizing a metal terminal.

However, attention has not been paid to the operation of an intake-temperature detecting element in the case that the intake air mass flow becomes a low air mass flow. Recent car engines are reducing idle-speed in order to reduce fuel cost. Therefore, reduction in the intake air mass flow has been promoted. When the intake air mass flow becomes low, the thermal resistance from the surface of an intake-temperature detecting element to the intake flow is rapidly increased. As a result, heat from an attachment part or self-heating of a circuit transmit through the metal terminal and changes the temperature of the intake-temperature detecting element. Therefore, a difference between the temperature of the intake-temperature detecting element and the intake temperature is generated, and the intake temperature cannot be accurately detected. If the thermal resistance from the surface of the intake-temperature detecting element to the intake flow becomes high, the thermal time constant generated by the thermal capacity of the intake-temperature detecting element per se reaches several tens of seconds, and detection delay of the intake temperature is increased.

In WO02/010694, an intake-temperature detecting element is disposed in a sub-passage, and an air mass flow detecting element and the intake-temperature detecting element are disposed on the same circuit board. However, the temperature of the structure of the sub-passage becomes different from that of the intake flow due to heat from the attachment part or the self-heating of the circuit. This tendency becomes strong particularly at a low air mass flow. Therefore, the temperature of the air in the sub-passage is changed due to thermal influence from the sub-passage structure and becomes a temperature different from that of the airflow to be measured. Since the intake-temperature detecting element is disposed in the sub-passage, the intake-temperature detecting element detects the temperature of the airflow in the sub-passage. As a result, errors are generated in the output of the intake-temperature detecting element.

Furthermore, since the temperature change of the sub-passage structure is affected by the thermal time constant of a housing, time of several tens of seconds to several minutes is required until the temperature of the sub-passage structure is stabilized. Therefore, in the above described techniques, the output of the intake temperature sensor becomes not accurate for several tens of seconds to several minutes after the intake temperature is changed. The circuit board employs a material having high thermal resistance such as a glass/epoxy resin. Therefore, although the influence of the self-heating from a drive circuit can be reduced, the consideration about reduction in the thermal resistance to the airflow is deficient, the thermal time constant of the intake-temperature detecting element at a low air mass flow reaches several tens of seconds and increases the detection delay of the intake temperature.

SUMMARY OF THE INVENTION

The present invention has been accomplished in view of the foregoing circumstances, and it is an object of the present invention to provide an intake temperature sensor capable of accurately detecting the intake temperature at high speed even in a low air mass flow zone.

The above described problem is achieved by fixing a temperature detecting element to a heat sink directly exposed to the intake flow in an intake pipe and outputting the intake temperature based on an output obtained from the temperature detecting element.

According to the present invention, the thermal resistance of the intake-temperature detecting element to the intake flow can be reduced; therefore, an intake temperature sensor capable of improving the accuracy of detecting the intake temperature at a low air mass flow and having high-speed responsiveness can be provided.

DETAILED DESCRIPTION OF THE PREFERRED EMBODIMENTS

Hereinafter, embodiments of the present invention will be explained in accordance with drawings.

Figure 1:
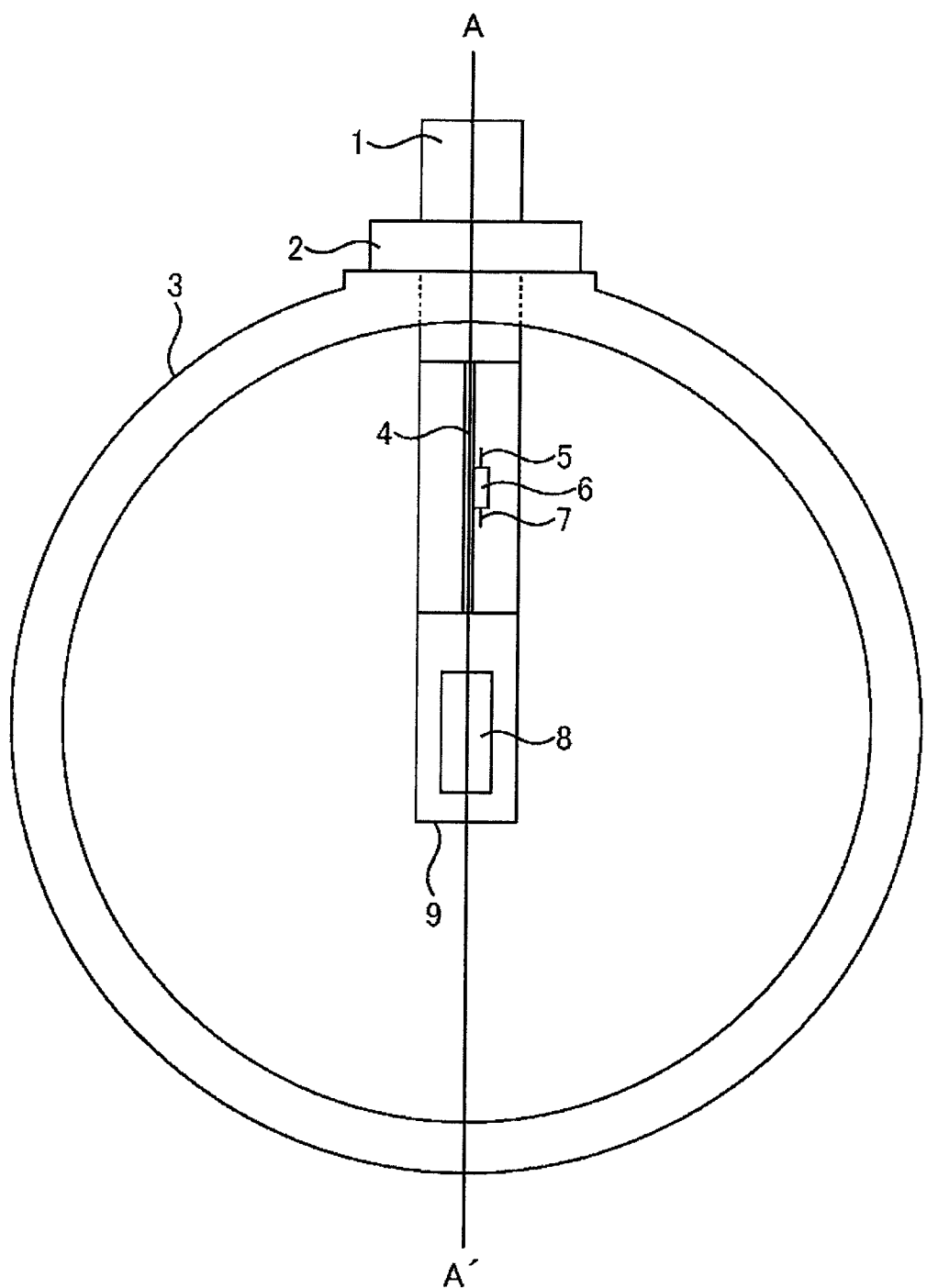
FIG. 1 is a mounted view showing the state in which an intake temperature sensor of a first embodiment is mounted on an intake pipe.
Figure 2:
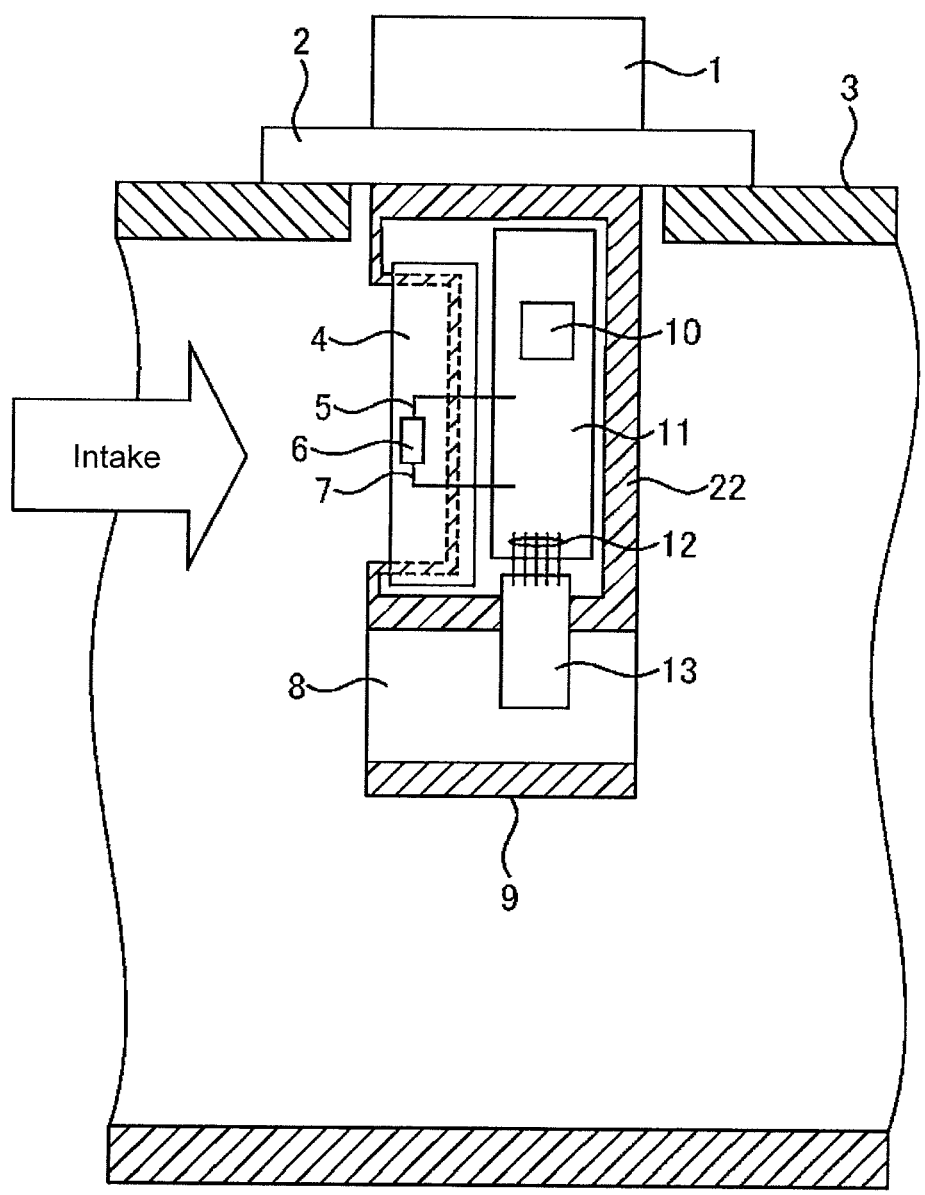
FIG. 2 is a cross sectional view of A-A' in FIG. 1.
Figure 3:
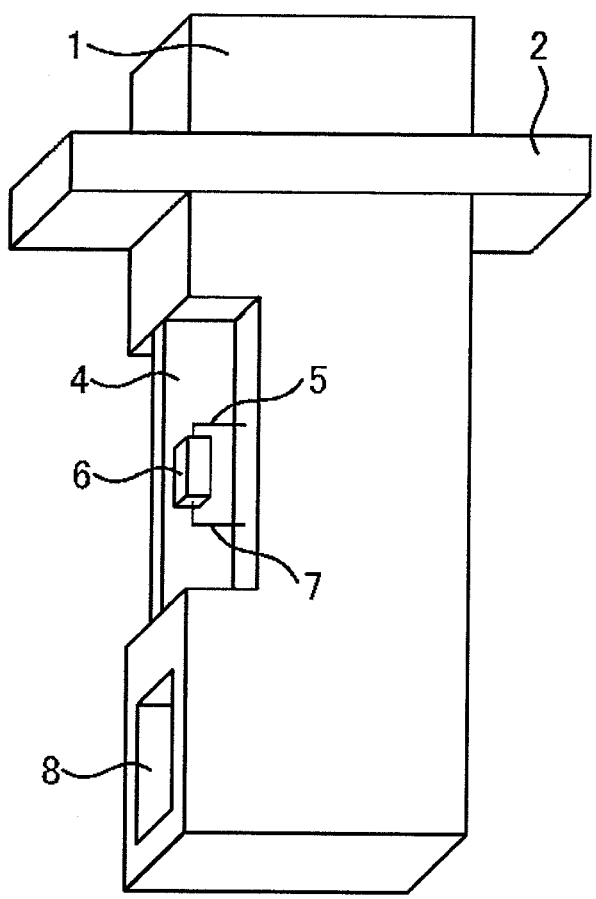
FIG. 3 is a perspective view of the intake temperature sensor of the first embodiment.
Figure 4:
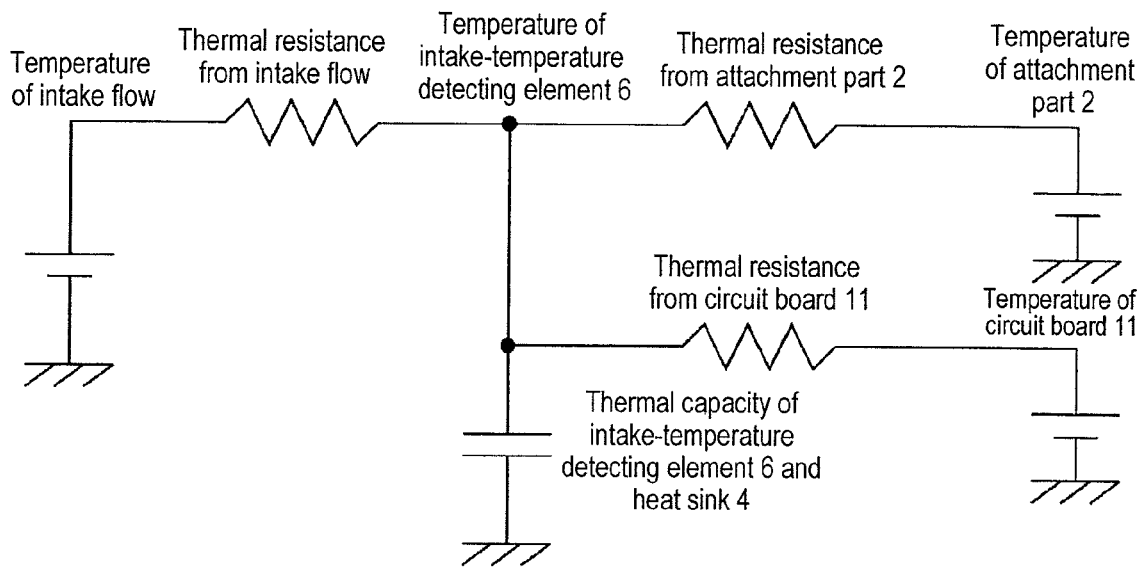
FIG. 4 shows a thermal equivalent circuit of the first embodiment.
Figure 5:
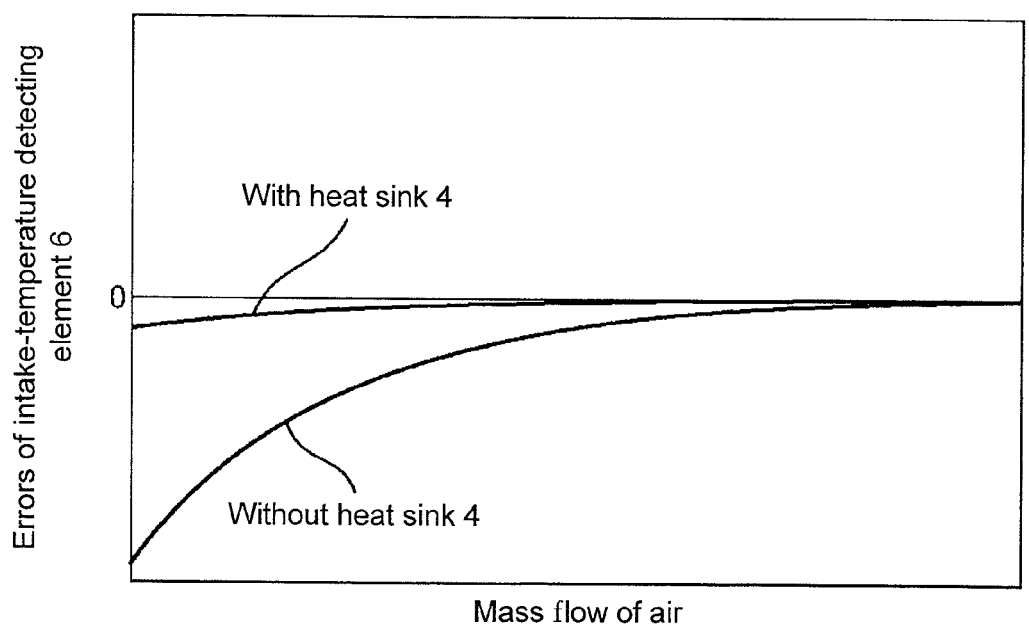
FIG. 5 shows error characteristics of an intake-temperature detecting element 6.

First, an intake temperature sensor 9 which is a first embodiment of the present invention will be explained by FIG. 1 to FIG. 5. FIG. 1 is a mounted view showing the state in which the intake temperature sensor 9 of the first embodiment is mounted on an intake pipe 3, FIG. 2 is a cross sectional view of A-A' in FIG. 1, FIG. 3 is a perspective view of the intake temperature sensor 9 of the first embodiment, FIG. 4 shows a thermal equivalent circuit of the first embodiment, and FIG. 5 shows error characteristics of an intake-temperature detecting element 6.

The intake temperature sensor 9 of the first embodiment according to the present invention is mounted in the manner that the sensor is inserted in an opening provided in an intake pipe 3 as shown in FIG. 1, and the intake temperature sensor 9 is fixed to the intake pipe 3 by an attachment part 2. The electrical connection from the intake temperature sensor 9 is made via a connector part 1. The intake temperature sensor 9 is provided with a sub-passage 8, and an air mass flow detecting element 13 is disposed in the sub-passage 8 so that the air mass flow in the intake pipe 3 can be measured. A heat sink 4 is fixed so as to be exposed to the outside of a housing of the intake temperature sensor 9 so that the heat sink 4 is directly exposed to the intake flow in the intake pipe. The intake-temperature detecting element 6 is disposed outside of the sub-passage 8 and in the upstream side of the intake flow with respect to a circuit board 11 and is mechanically fixed to the heat sink 4 by, for example, an adhesive agent having high thermal conductivity to be thermally coupled with the heat sink 4. The intake-temperature detecting element 6 is electrically connected to the inside of a housing 22 of the intake temperature sensor 9 via leads 5 and 7. The circuit board 11 is disposed in the housing 22, and an integrated circuit 10 for processing the output signals of the intake-temperature detecting element 6 and the air mass flow detecting element 13 is disposed on the circuit board 11. The air mass flow detecting element 13 is connected to the circuit board 11 by gold wires 12.

The intake-temperature detecting element 6 can be composed of a thermistor, a platinum resistance, a thermocouple, a resistance having a large thermal coefficient, or the like. Particularly, if a thick print resistance is utilized by the intake-temperature detecting element 6, the thermal capacity of the intake-temperature detecting element 6 per se can be reduced, and responsiveness can be improved. The heat sink 4 is preferred to be composed of a material having a high thermal conductivity such as metal or ceramic in order to enhance the effect of dissipating heat to the air. In that case, the effective heat-dissipation area can be increased since the temperature of the heat sink 4 becomes uniform. The thermal conductivity of the heat sink 4 is desired to be at least 1 W/m·k. The housing 22 of the intake-temperature sensor 9 is preferred to be composed of a material having a small thermal conductivity such as plastic, a polybutylene terephthalate resin, or a polyphenylene sulfide resin. In that case, thermal conduction from the adhesion part of the heat sink 4 and the housing 22 can be reduced.

In the present embodiment, the intake-temperature detecting element 6 is fixed to the heat sink 4 to thermally couple the intake-temperature detecting element 6 and the heat sink 4 to each other, thereby increasing the area of heat dissipation to the intake flow and reducing the thermal resistance to the intake flow.

The thermal equivalent circuit of the intake-temperature sensor 9 of the present embodiment is expressed as shown in FIG. 4, and the temperature of the intake-temperature detecting element 6 is affected by the ratio of the thermal resistance from the intake flow and the thermal resistance from the attachment part 2 and the circuit board 11. Therefore, the temperature of the intake-temperature detecting element 6 can be brought closer to that of the intake flow by reducing the thermal resistance from the intake flow and increasing the thermal resistance from the attachment part 2 and the circuit board 11. The thermal resistance from the intake flow is inversely proportional to the flow velocity to the second power; therefore, the thermal resistance is rapidly increased at a low flow velocity, and errors are increased at a low air mass flow. However, in the present embodiment, the thermal resistance from the intake flow can be reduced by increasing the heat-dissipation area. If an intake-temperature sensor capable of supporting half the air mass flow is to be realized, the flow velocity becomes half, and the thermal resistance therefore is quadrupled. At least a quadrupled area is required in order to support this by increasing the heat-dissipation area.

FIG. 5 shows errors of the intake-temperature detecting element 6 with and without the heat sink 4. As is clear also from FIG. 5, errors are increased when the mass flow of air is reduced and enters a low air mass flow area, and the detection errors can be reduced by providing the heat sink 4.

The thermal resistance from the intake flow generates a thermal time constant together with the thermal capacity of the intake-temperature detecting element 6 per se. The thermal time constant generates delay in the detection of the intake temperature. The thermal time constant even becomes several tens of seconds in the low air mass flow area, which leads to deterioration in controllability if the intake-temperature sensor is used in control of a car engine. However, since the thermal resistance to the intake flow can be reduced according to the present embodiment, the thermal time constant can be reduced, and speed-up of the intake temperature sensor can be achieved.

Mechanical protection of the intake-temperature detecting element 6 was realized by fixing the intake-temperature detecting element 6 to the heat sink 4. As a result, mechanical shock can be prevented from being directly applied to the intake-temperature detecting element 6 even when the intake temperature sensor 9 falls. The housing of the intake temperature sensor 9 is provided with a recessed part, and the heat sink 4 is disposed in the recessed part, thereby realizing mechanical protection of the heat sink 4. As a result, even when the intake temperature sensor 9 falls, mechanical shock can be prevented from being applied to the heat sink 4.

Figure 6:
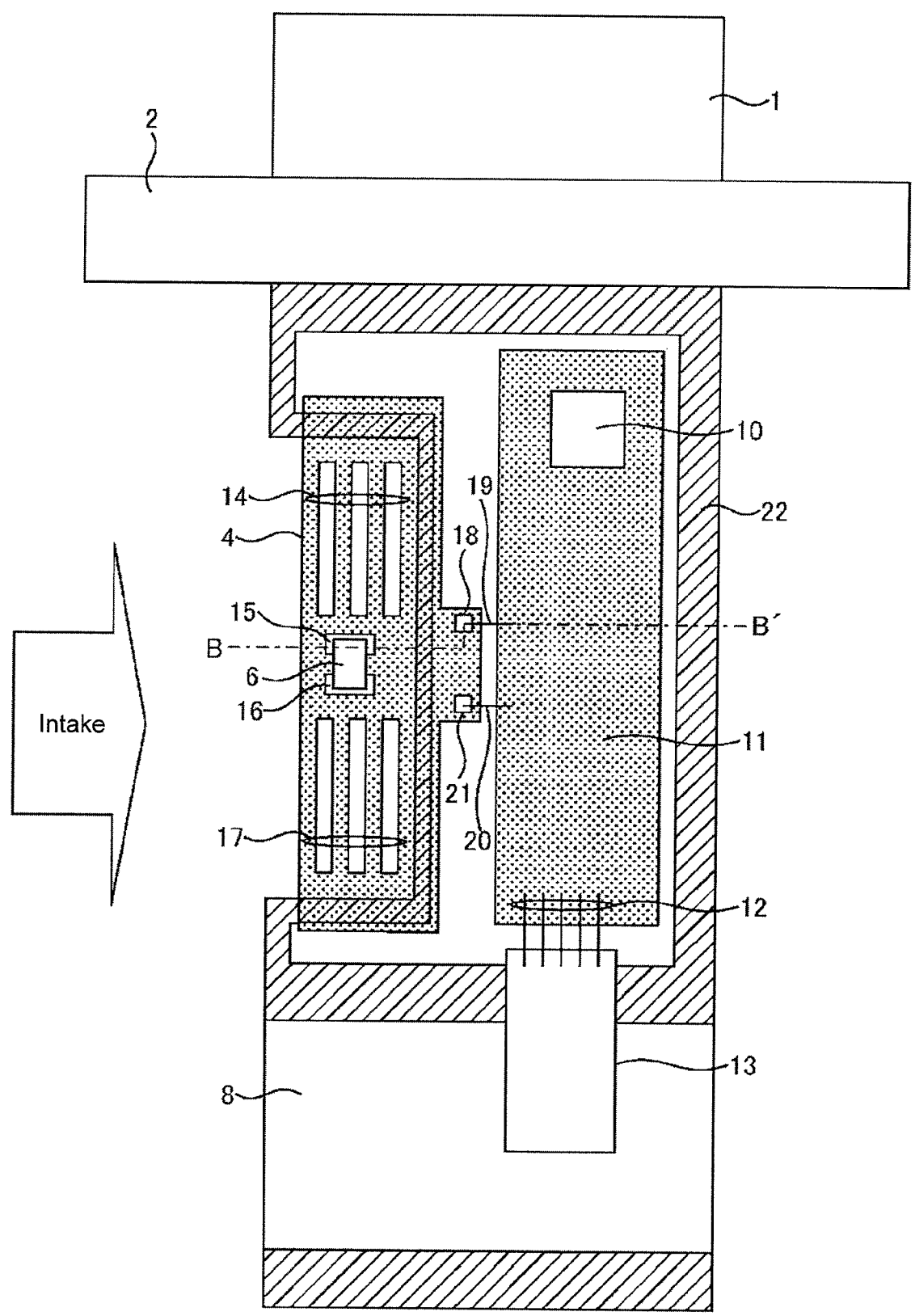
FIG. 6 is a cross section of A-A' in FIG. 1 of an intake temperature sensor of a second embodiment.
Figure 7:
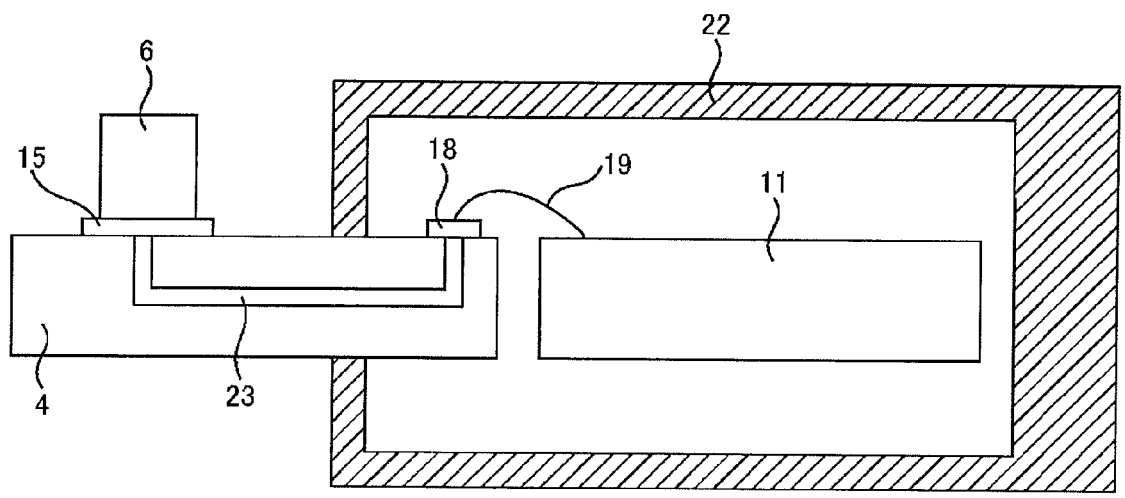
FIG. 7 is a cross section of B-B' in FIG. 6.
Figure 8:
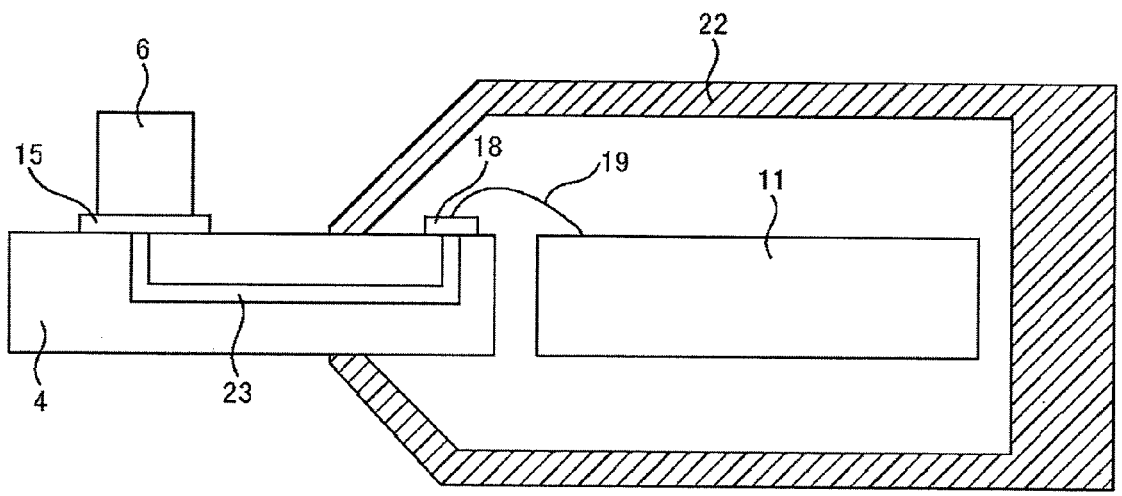
FIG. 8 is a cross section of B-B' in FIG. 6 of a modification example of the second embodiment.
Figure 9:
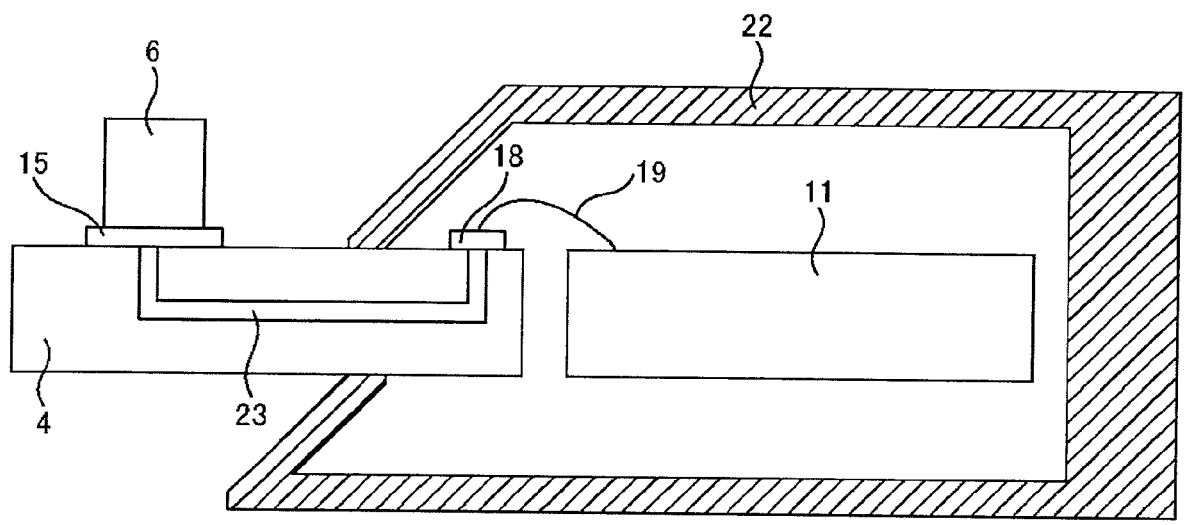
FIG. 9 is a cross section of B-B' in FIG. 6 of a modification example of the second embodiment.

Next, an intake temperature sensor which is a second embodiment of the present invention will be explained by FIG. 6 to FIG. 9. FIG. 6 is a cross section of A-A' in FIG. 1 of the intake temperature sensor of the second embodiment, FIG. 7 is a cross section of B-B' in FIG. 6, and FIG. 8 and FIG. 9 are cross sections of B-B' in FIG. 6 which are modification examples of the second embodiment.

The intake temperature sensor of the second embodiment basically has the same structure as the intake temperature sensor of the first embodiment, but is modified in the below manner. The parts having the same structures as the previously-explained embodiment are denoted by the same symbols, and explanations thereof will be omitted.

In the present embodiment, a ceramic substrate was used as the heat sink 4, slits 14 and 17 were provided, a chip-type intake-temperature detecting element 6 was used, and the intake-temperature detecting element 6 was fixed by solder by using solder pads 15 and 16. The slits 14 are provided in the attachment part 2 side with respect to the intake-temperature detecting element 6, and the slits 14 are formed along the side of the heat sink 4 that is in the direction perpendicular to the intake flow. On the other hand, the slits 17 are provided in the sub-passage 8 side with respect to the intake-temperature detecting element 6, and the slits 17 are formed along the side of the heat sink 4 that is in the direction perpendicular to the intake flow. The plurality of slits 14 and 17 are disposed in parallel so as to be along the intake flow. As shown in FIG. 7, the solder pad 15 is connected to a solder pad 18 in the housing 22 of the intake temperature sensor 9 via an inner-layer wiring pattern 23 and is electrically connected to the circuit board 11 via a gold wire 19. Similarly, the solder pad 16 is also connected to a solder pad 21 in the housing 22 via an inner-layer wiring pattern and is electrically connected to the circuit board 11 via a gold wire 20.

In the present embodiment, the intake-temperature detecting element 6 can be fixed to the heat sink 4 by using the solder having high thermal conductivity; therefore, good thermal coupling between the intake-temperature detecting element 6 and the heat sink 4 can be achieved. Also, since wiring can be formed in the housing 22 by using the inner-layer wiring pattern 23, airtightness in the housing can be more improved than the case using the leads 5 and 7 like the first embodiment. Since the passages of air can be provided by providing the slits 14 and 17, the surface area of the heat sink 4 can be increased, disturbance can be generated in the air flow to reduce heat-dissipation resistance, and, furthermore, the thermal conductivity from the part of connection with the housing 22 can be reduced. The chip-type part is used as the intake-temperature detecting element 6 in the present embodiment; however, it is also possible to manufacture a thick film resistance by printing.

When smooth flow of the intake flow is achieved by providing oblique parts on the housing 22 as shown in the modification example shown in FIG. 8, reduction in the flow velocity of the intake flow can be suppressed, and reduction in the thermal resistance to the intake flow can be achieved as a result.

When the intake flow is caused to flow through the slits 14 and 17 by providing oblique parts on the housing 22 like the modification example shown in FIG. 9, large disturbance can be generated in the flow of intake, and reduction in the thermal resistance to the intake flow can be achieved.

Figure 10:
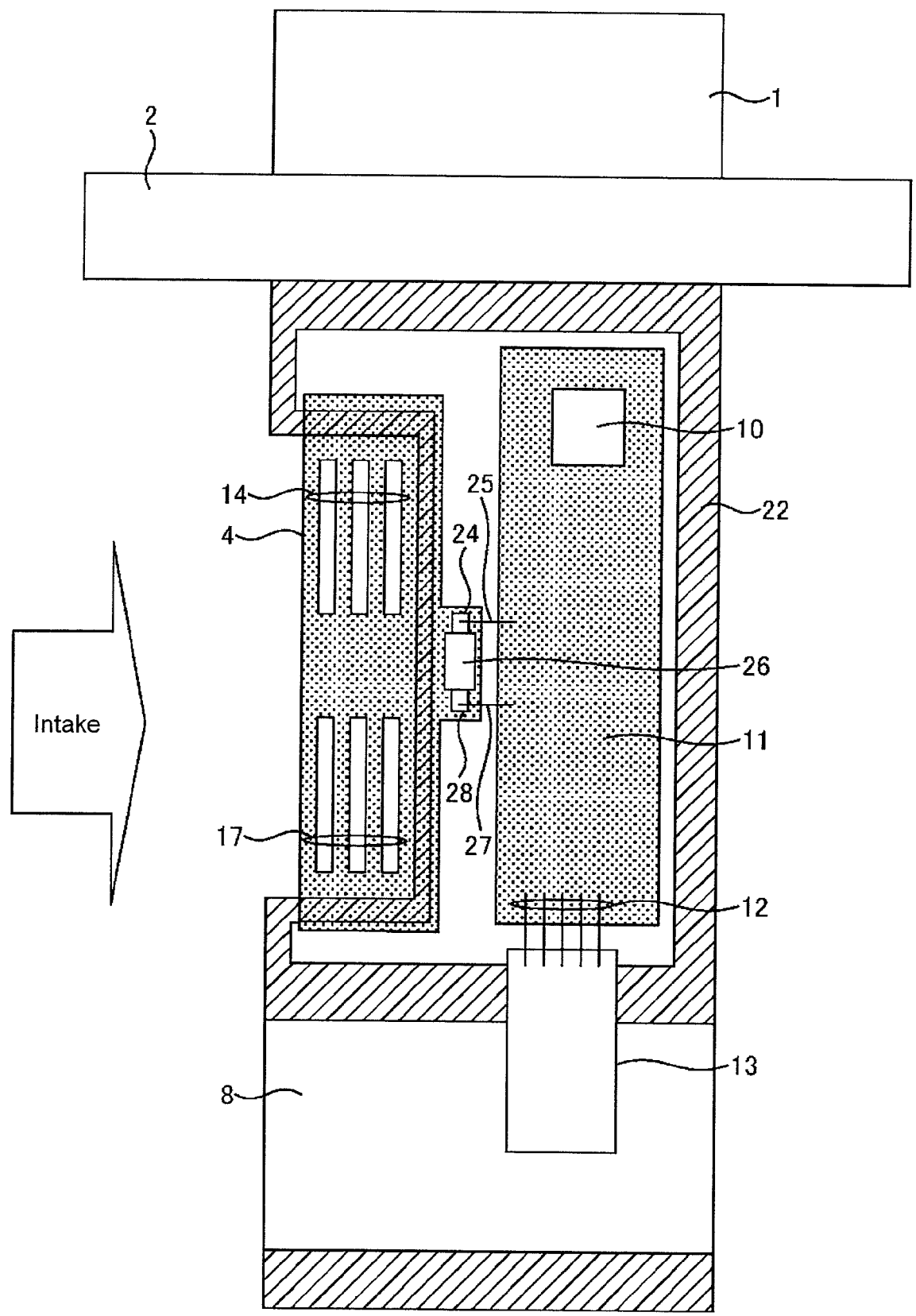
FIG. 10 is a cross section of A-A' in FIG. 1 of an intake temperature sensor of a third embodiment.

Next, an intake temperature sensor which is a third embodiment of the present invention will be explained by FIG. 10. FIG. 10 is a cross section of A-A' in FIG. 1 of the intake temperature sensor of the third embodiment.

The intake temperature sensor of the third embodiment basically has the same structure as the intake temperature sensor of the second embodiment, but is modified in the below manner. The parts having the same structures as the previously-explained embodiments are denoted by the same symbols, and explanations thereof will be omitted.

In the present embodiment, an intake-temperature detecting element 26 is disposed in the housing 22 of the intake-temperature sensor 9, the intake-temperature detecting element 26 is fixed by solder by using pads 24 and 28 and is electrically connected to the circuit board 11 via the pads 24 and 28 and gold wires 25 and 27.

In the present embodiment, sine the intake-temperature detecting element 26 can be disposed in the housing 22, the intake-temperature detecting element 26 can be very easily protected. Since the intake temperature sensor 9 is exposed to rain contamination, gasoline vapor, backfire, etc. since the sensor is disposed in the intake pipe, surface protection has been very important, and glass coating or the like has been required; however, since the intake-temperature detecting element 26 can be disposed in the housing 22 according to the present embodiment, the glass coating or the like becomes unnecessary.

Figure 11:
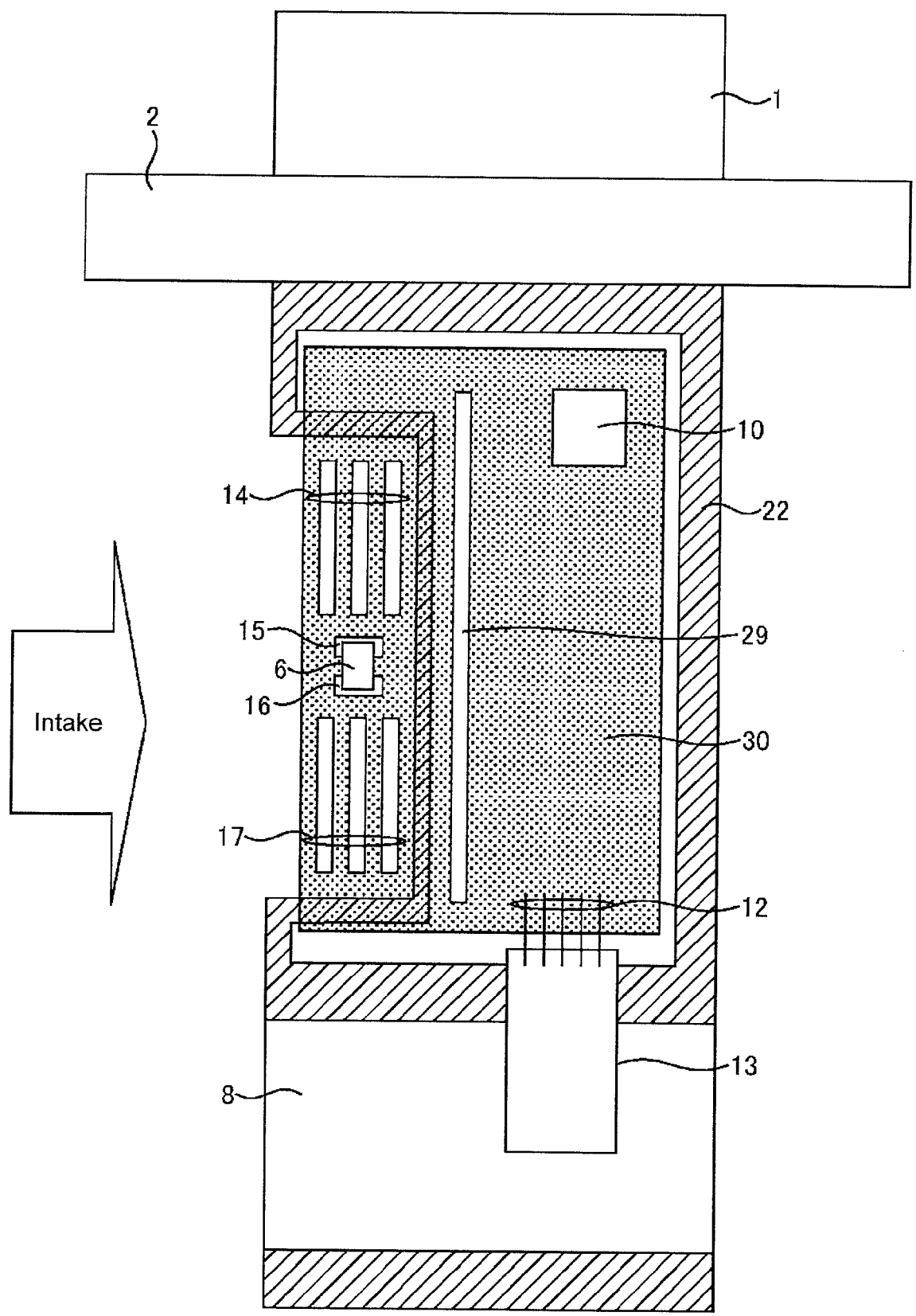
FIG. 11 is a cross section of A-A' in FIG. 1 of an intake temperature sensor of a fourth embodiment.

Next, an intake temperature sensor which is a fourth embodiment of the present invention will be explained by FIG. 11. FIG. 11 is a cross section of A-A' in FIG. 1 of the intake temperature sensor of the fourth embodiment.

The intake temperature sensor of the fourth embodiment basically has the same structure as the intake temperature sensor of the second embodiment, but is modified in the below manner. The parts having the same structures as the previously-explained embodiments are denoted by the same symbols, and explanations thereof will be omitted.

In the present embodiment, a substrate 30 in which the heat sink 4 and the circuit board 11 are composed of the same member is disposed. The heat sink 4 requires a high thermal conductivity, and the circuit board 11 requires the wiring pattern; and a ceramic substrate, a metal base substrate, or the like is employed as a member that realizes these requirements. Therefore, the wiring from the intake-temperature detecting element 6 to the integrated circuit 10 can be connected only by the wiring pattern of the substrate 30 without using gold wires, and improvement in the reliability of wire connection and reduction in the cost by reduction in man-hours can be achieved. A slit 29 is provided so that the self-heating of the integrated circuit 10 does not affect the intake-temperature detecting element 6, thereby preventing the generation of heat from the integrated circuit 10 from being transmitted to the intake-temperature detecting element 6. In the case in which the heat sink 4 and the circuit board 11 are composed of the same member like the present embodiment, the substrate 30 is desired to be rectangular. Therefore, the configuration including a recessed part on the housing 22 and the heat sink 4 thereon has below advantages. The first advantage is that the substrate 30 can be rectangular. The second advantage is that introduction/discharge of the intake smoothly flows if it has the recessed shape.

Figure 12:
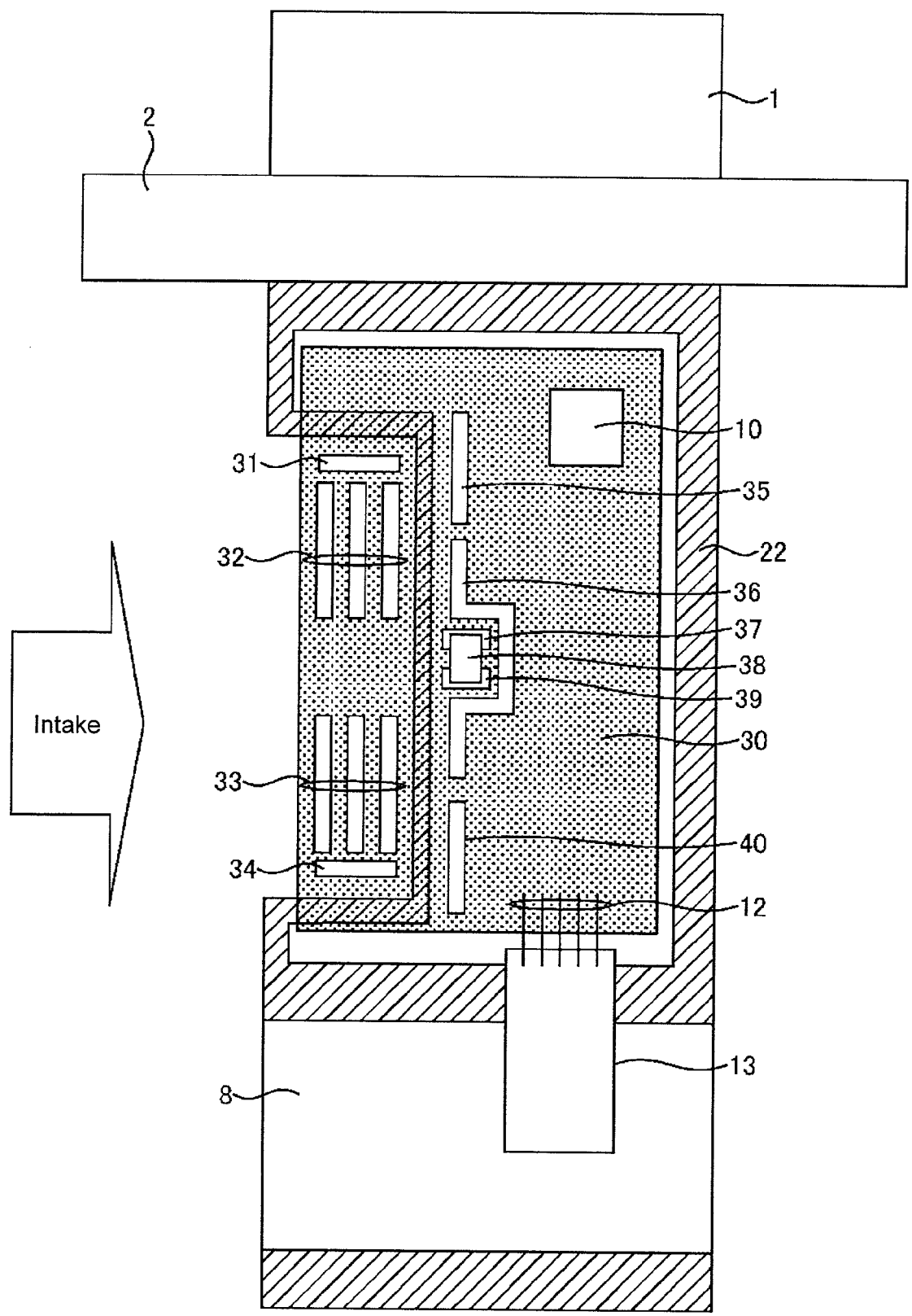
FIG. 12 is a cross section of A-A' in FIG. 1 of an intake temperature sensor of a fifth embodiment.

Next, an intake temperature sensor which is a fifth embodiment of the present invention will be explained by FIG. 12. FIG. 12 is a cross section of A-A' in FIG. 1 of the intake temperature sensor of the fifth embodiment.

The intake temperature sensor of the fifth embodiment basically has the same structure as the intake temperature sensor of the fourth embodiment, but is modified in the below manner. The parts having the same structures as the previously-explained embodiments are denoted by the same symbols, and explanations thereof will be omitted.

In the present embodiment, effects similar to the second embodiment can be obtained by disposing an intake-temperature detecting element 38 in the housing 22. Slits 35, 36 and 40 are provided so that the self-heating of the integrated circuit 10 does not affect the intake-temperature detecting element 38, and generation of the heat from the integrated circuit 10 is prevented from being transmitted to the intake-temperature detecting element 38. Particularly, the slit 36 is provided so as to surround the periphery of the intake-temperature detecting element 38. Gaps are formed between the slits 35, 36 and 40 so as to ensure the area through which wiring patterns are provided. A slit 31 is formed along the intake flow in the side closer to the attachment part 2 than slits 32 are, and a slit 34 is formed along the intake flow in the side closer to the sub-passage 8 than slits 33 are, thereby disposing the slits and preventing inflow of heat from the part fixed with the housing 22. The heat-dissipation resistance to the intake flow is reduced by the slits 32 and 33. The intake-temperature detecting element 38 is fixed by solder by solder pads 37 and 39.

Figure 13:
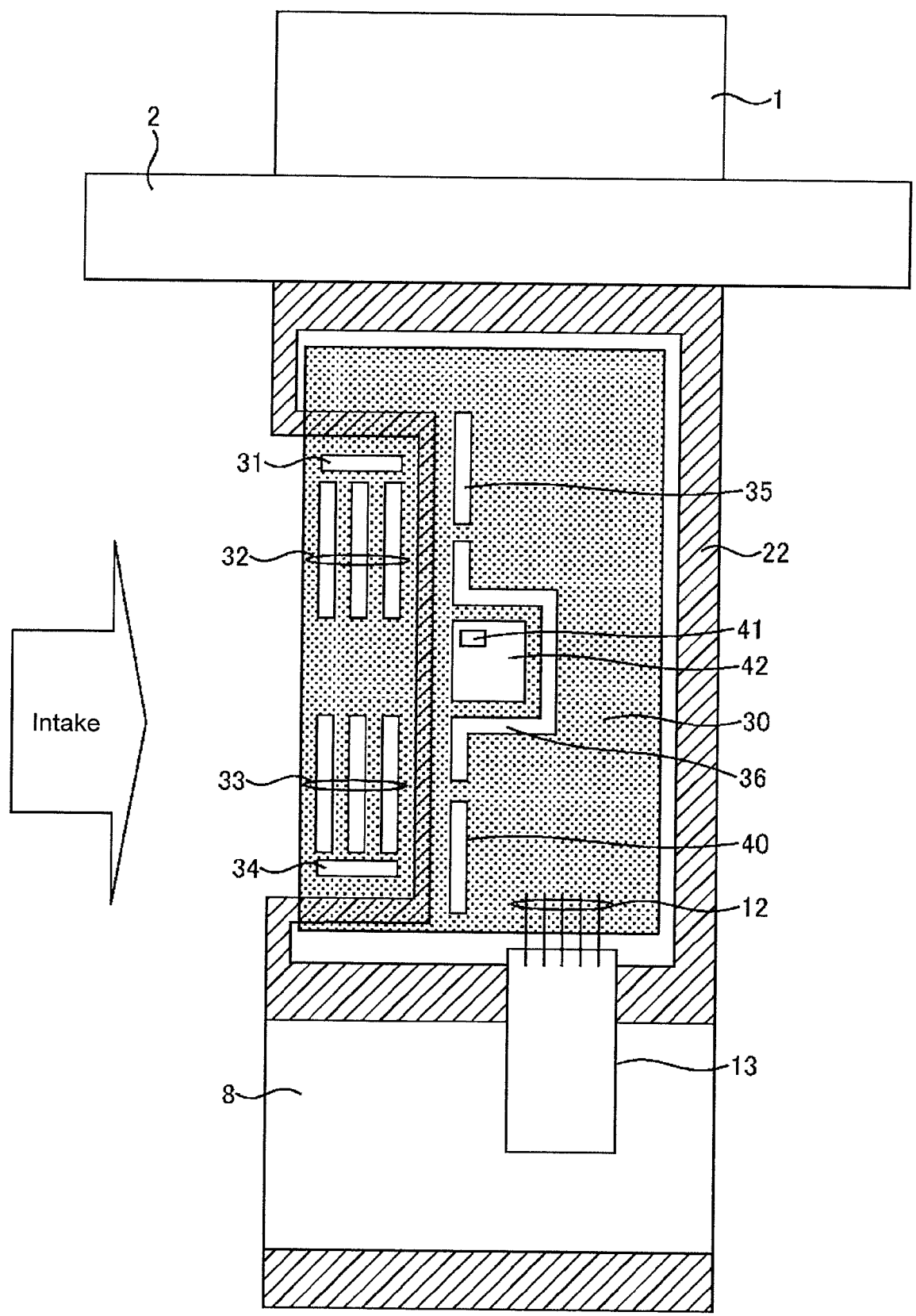
FIG. 13 is a cross section of A-A' in FIG. 1 of an intake temperature sensor of a sixth embodiment.

Next, an intake temperature sensor which is a sixth embodiment of the present invention will be explained by FIG. 13. FIG. 13 is a cross section of A-A' in FIG. 1 of the intake temperature sensor of the sixth embodiment.

The intake temperature sensor of the sixth embodiment basically has the same structure as the intake temperature sensor of the fifth embodiment, but is modified in the below manner. The parts having the same structures as the previously-explained embodiments are denoted by the same symbols, and explanations thereof will be omitted.

In the present embodiment, an integrated circuit 42 having a temperature sensor 41 was disposed instead of the intake-temperature detecting element 38, and the intake temperature was detected by the temperature sensor 41. The integrated circuit 42 having a small suppressed self-heating is required in order to realize the present embodiment. According to the present embodiment, the intake-temperature detecting element 38 can be eliminated, and cost can be reduced by reducing the number of parts.

Figure 14:
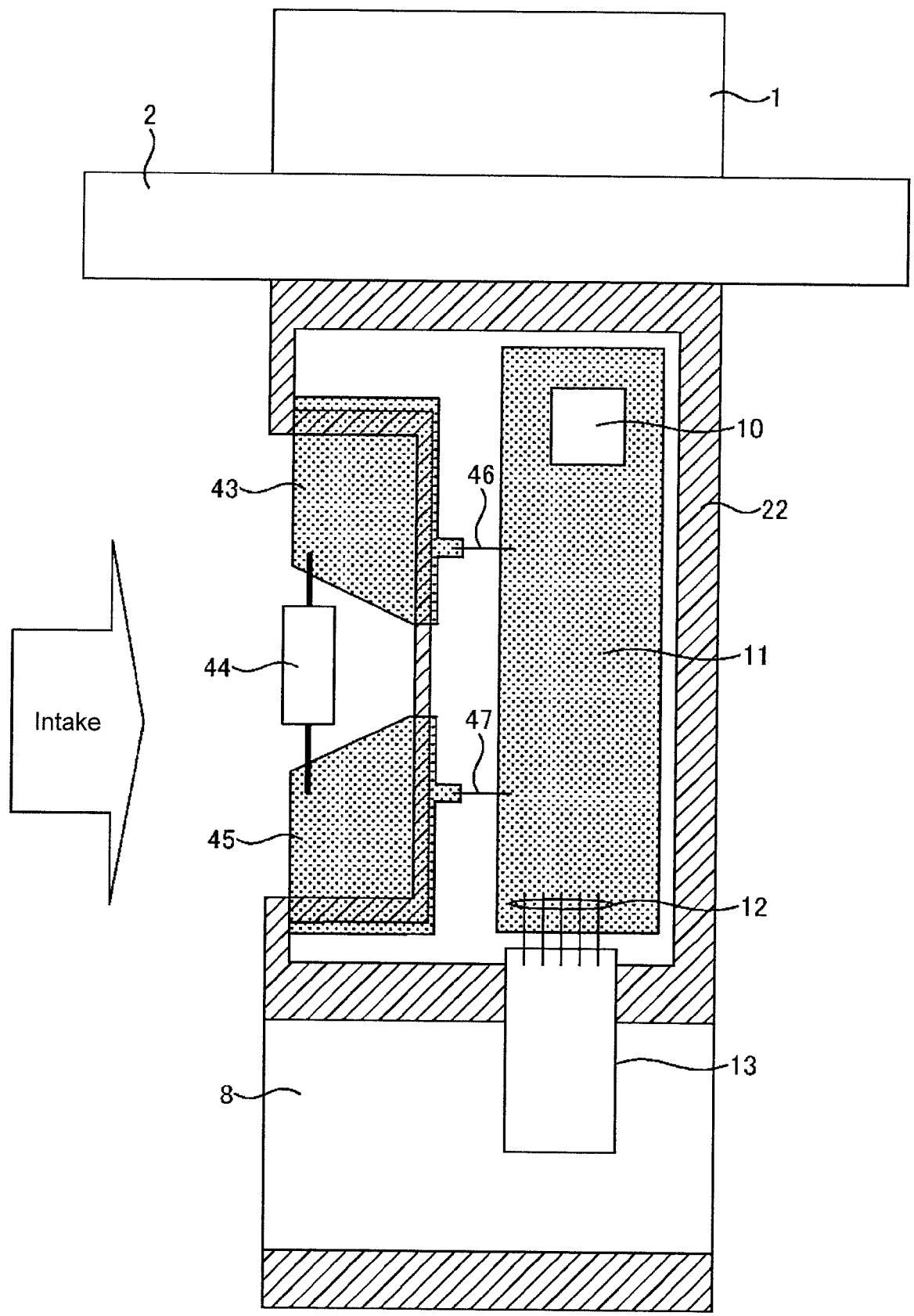
FIG. 14 is a cross section of A-A' in FIG. 1 of an intake temperature sensor of a seventh embodiment.

Next, an intake temperature sensor which is a seventh embodiment of the present invention will be explained by FIG. 14. FIG. 14 is a cross section of A-A' in FIG. 1 of the intake temperature sensor of the seventh embodiment.

The intake temperature sensor of the seventh embodiment basically has the same structure as the intake temperature sensor of the second embodiment, but is modified in the below manner. The parts having the same structures as the previously-explained embodiments are denoted by the same symbols, and explanations thereof will be omitted.

In the present embodiment, the heat sink 4 was replaced by metal plates 43 and 45, the intake-temperature detecting element 6 was replaced by a lead-type thermistor 44, and leads of the thermistor 44 are connected to the metal plates 43 and 45 and electrically connected to the circuit board 11 via gold wires 46 and 47.

Thus, in the present embodiment, the metal plates 43 and 45 and the leads of the thermistor 44 were mechanically, electrically, and thermally coupled, thereby reducing the heat resistance to the intake flow by the metal plates 43 and 45 and reducing the heat resistance to the intake flow of the thermistor 44, which is thermally coupled to the metal plates 43 and 45. Also in the present embodiment, the thermal resistance from the thermistor 44 to the intake flow can be reduced; therefore, detection of the intake temperature at a low air mass flow and speed-up can be realized. The heat-dissipation area of the metal plates 43 and 45 is required to be at least four times that of the surface area of the thermistor 44.

Figure 15:
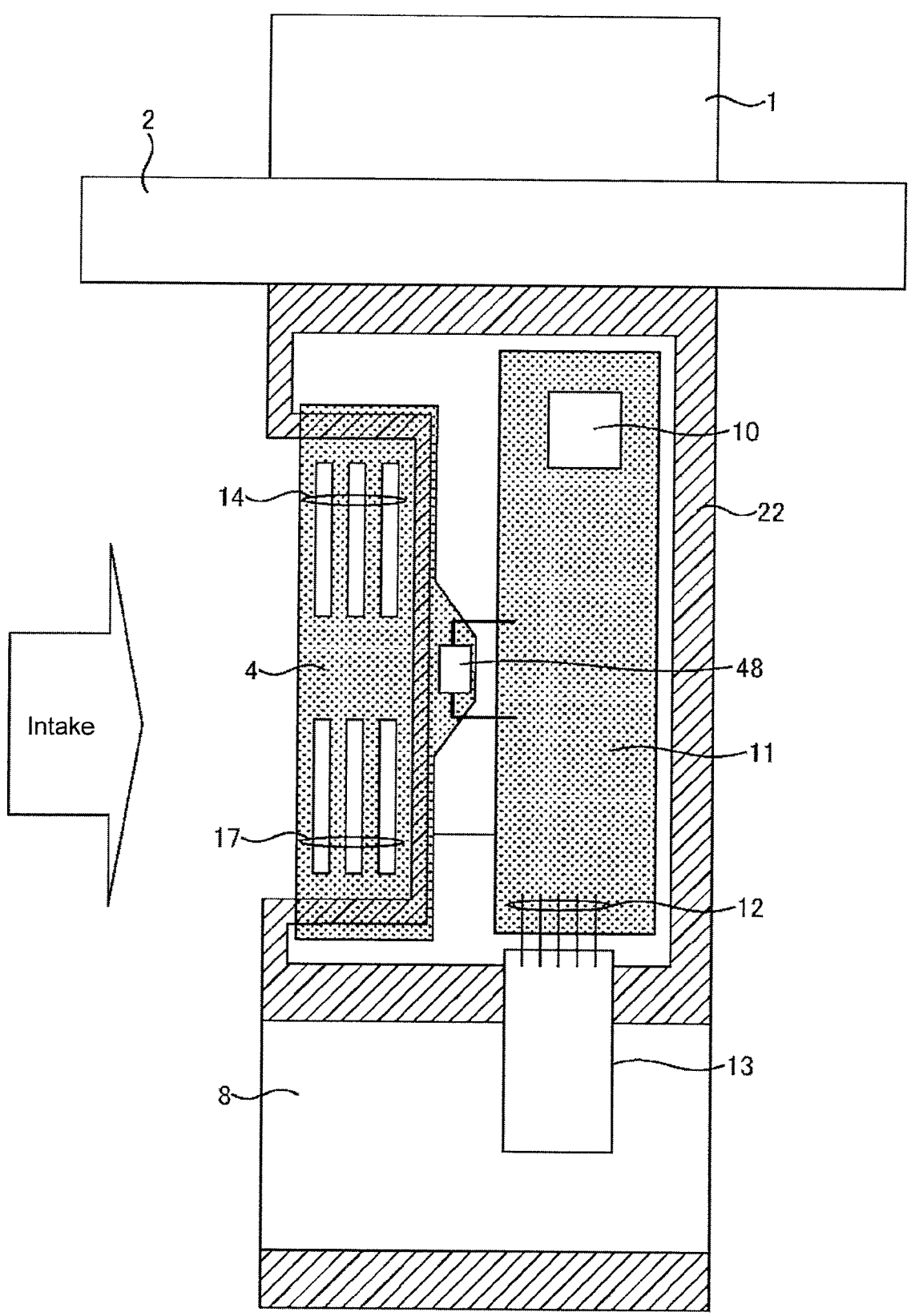
FIG. 15 is a cross section of A-A' in FIG. 1 of an intake temperature sensor of an eighth embodiment.

Next, an intake temperature sensor which is an eighth embodiment of the present invention will be explained by FIG. 15. FIG. 15 is a cross section of A-A' in FIG. 1 of the intake-temperature sensor of the eighth embodiment.

The intake temperature sensor of the eighth embodiment basically has the same structure as the intake temperature sensor of the second embodiment, but is modified in the below manner. The parts having the same structures as the previously-explained embodiments are denoted by the same symbols, and explanations thereof will be omitted.

In the present embodiment, the heat sink 4 is replaced by metal, and slits 14 and 17 are provided. The slits 14 are provided in the attachment part 2 side, and the slits 14 are formed along the side of the heat sink 4 that is in the direction perpendicular to the intake flow. On the other hand, the slits 17 are provided in the sub-passage 8 side, and the slits 17 are formed along the side of the heat sink 4 that is in the direction perpendicular to the intake flow. The plurality of slits 14 and 17 are disposed in parallel so as to be along the intake flow.

The intake-temperature detecting element was replaced by a lead-type thermistor 48, and the thermistor 48 was disposed in the housing 22 and mechanically fixed to the heat sink 4 to thermally couple the thermistor thereto. Leads of the thermistor 48 are directly connected to the circuit board 11.

In the present embodiment, thermal resistance to the intake can be reduced even at a low air mass flow by exposing the heat sink 4 to the intake. Since the thermistor 48 is thermally coupled to the heat sink 4, the temperature thereof becomes the same temperature as that of the heat sink 4. In the present embodiment, since the large heat sink 4 can be provided, the thermal resistance to the intake flow can be reduced even when the air mass flow is low. Since the thermistor 48 can be disposed in the housing 22, the thermistor 48 can be easily protected. Since the heat sink 4 can be composed of metal, the thermal conductivity of the heat sink 4 can be reduced more compared with ceramic or the like.

Figure 16:
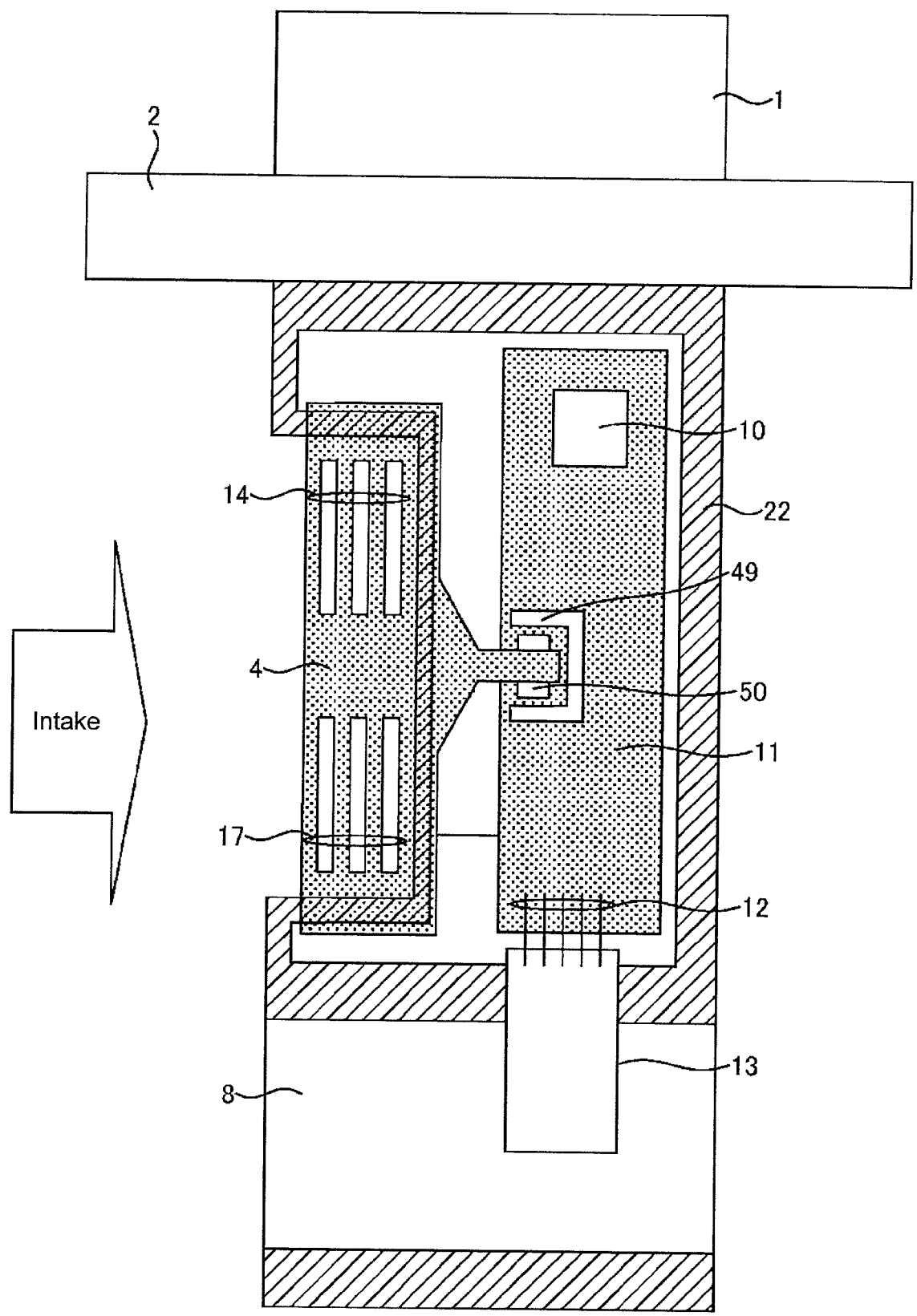
FIG. 16 is a cross section of A-A' in FIG. 1 of an intake temperature sensor of a ninth embodiment.

Next, an intake temperature sensor which is a ninth embodiment of the present invention will be explained by FIG. 16. FIG. 16 is a cross section of A-A' in FIG. 1 of the intake temperature sensor of the ninth embodiment.

The intake temperature sensor 9 of the ninth embodiment basically has the same structure as the intake temperature sensor of the eighth embodiment, but is modified in the below manner. The parts having the same structures as the previously-explained embodiments are denoted by the same symbols, and explanations thereof will be omitted.

In the present embodiment, an intake-temperature detecting element 50 is disposed on the circuit board 11, and part of the heat sink 4 is extended and fixed with the intake-temperature detecting element 50, thereby thermally coupling them. A slit 49 is provided in order to reduce thermal influence from the circuit. The slit 49 is disposed so as to surround the intake-temperature detecting element 50 and has an approximately U-shape. However, the shape of the slit 49 is not limited to the approximately U-shape as long as the shape can reduce the thermal influence from the circuit, and, for example, the shape may be a slit shape as explained in the fifth embodiment.

In the present embodiment, the thermal resistance to the intake can be reduced even at a low air mass flow by exposing the heat sink 4 to the intake. Since the intake-temperature detecting element 50 is thermally coupled to the heat sink 4, the temperature thereof becomes the same as that of the heat sink 4. In the present embodiment, since the heat sink 4 which is large can be provided, thermal resistance to the intake can be reduced even when the air mass flow is low. Since the intake-temperature detecting element 50 can be disposed in the housing 22, the intake-temperature detecting element 50 can be easily protected. Since the heat sink 4 can be composed of metal, the thermal conductivity of the heat sink 4 can be reduced more compared with ceramic or the like. Since the intake-temperature detecting element 50 can be disposed on the circuit board 11, wiring of the intake-temperature detecting element 50 can be easily implemented.

Figure 17:
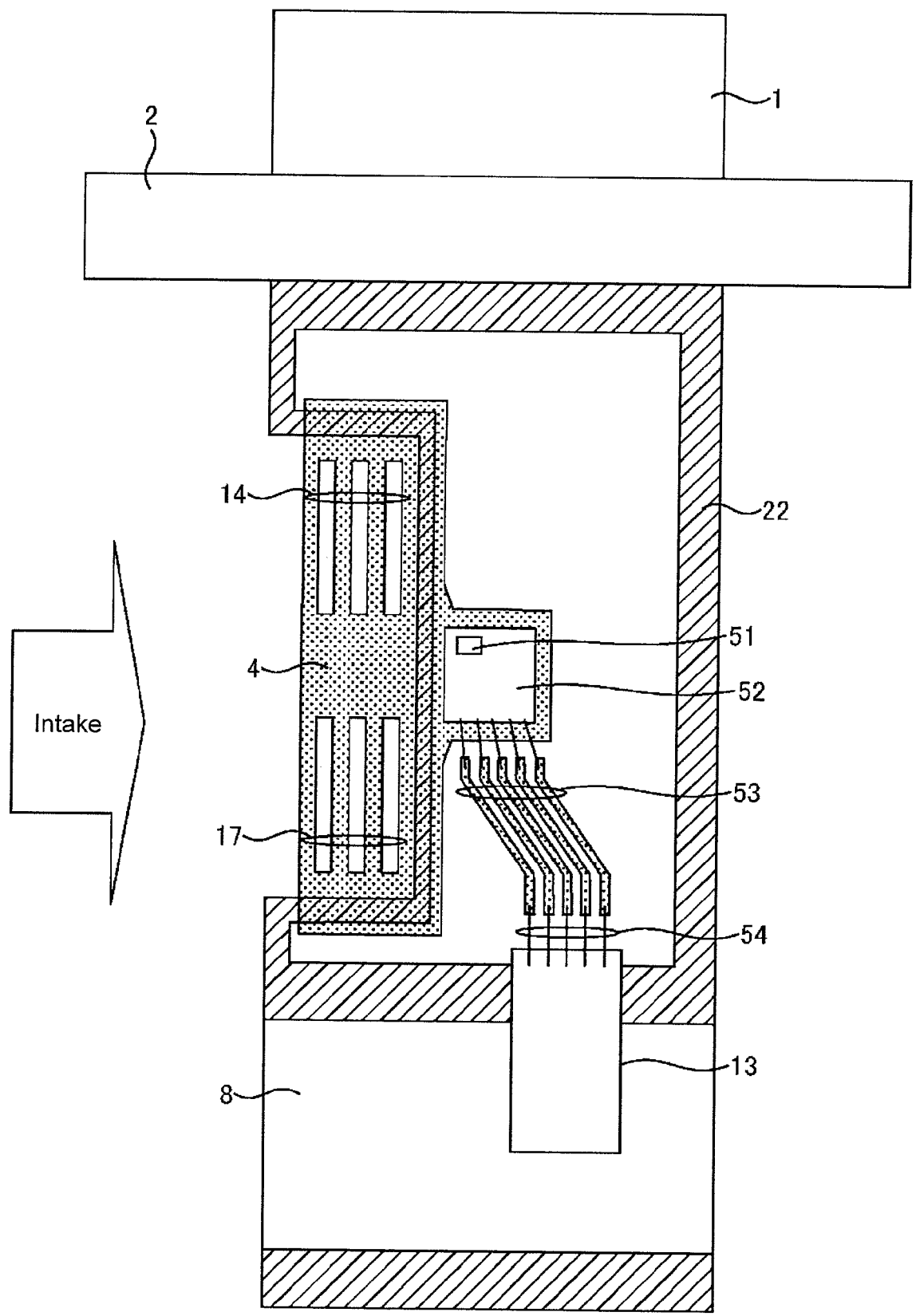
FIG. 17 is a cross section of A-A' in FIG. 1 of the intake temperature sensor of the ninth embodiment.

Next, an intake temperature sensor which is a tenth embodiment of the present invention will be explained by FIG. 17. FIG. 17 is a cross section of A-A' in FIG. 1 of the intake temperature sensor of the tenth embodiment.

The intake temperature sensor of the tenth embodiment basically has the same structure as the intake temperature sensor of the ninth embodiment, but is modified in the below manner. The parts having the same structures as the previously-explained embodiments are denoted by the same symbols, and explanations thereof will be omitted.

In the present embodiment, the circuit board 11 is eliminated, and an integrated circuit 52 in which a temperature sensor 51 is incorporated at an extended part of the heat sink 4 is disposed. Connection with the air mass flow detecting element 13 is implemented by a lead frame 53 and gold wires 54. In the present embodiment, thermal resistance to the intake can be reduced even when the air mass flow is low by exposing the heat sink 4 to the intake. Since the integrated circuit 52 is thermally coupled to the heat sink 4, when the self-heating of the integrated circuit 52 is reduced, the temperature thereof becomes the same as that of the heat sink 4. In the present embodiment, since the heat sink 4 which is large can be provided, the thermal resistance to the intake can be reduced even when the air mass flow is low. Since the heat sink 4 can be composed of metal, the thermal conductivity of the heat sink 4 can be reduced more compared with ceramic. When the integrated circuit 52 in which the temperature sensor 51 is incorporated is used, the circuit board per se can be eliminated, and cost can be reduced.

DESCRIPTION OF SYMBOLS

1 CONNECTOR PART
2 ATTACHMENT PART
3 INTAKE PIPE
4 HEAT SINK
5, 7 LEAD
6, 26, 38, 50 INTAKE-TEMPERATURE DETECTING ELEMENT
8 SUB-PASSAGE
9 INTAKE TEMPERATURE SENSOR
10, 42, 52 INTEGRATED CIRCUIT
11 CIRCUIT BOARD
12, 19, 20, 25, 27, 46, 47, 54 GOLD WIRE
13 AIR MASS FLOW DETECTING ELEMENT
14, 17, 29, 31, 32, 33, 34, 35, 36, 40, 49 SLIT
15, 16, 18, 21, 37, 39 SOLDER PAD
22, 55 HOUSING
23 INNER-LAYER WIRING PATTERN
24, 28 PAD
30 SUBSTRATE
41, 51 TEMPERATURE SENSOR
43, 45 METAL PLATE
44, 48 THERMISTOR
53 LEAD FRAME

What is claimed is:

1. An intake temperature sensor comprising a housing with a temperature detecting element, inserted in an opening provided in an intake pipe to be disposed in the intake pipe, wherein
the temperature detecting element is mechanically joined with a heat sink exposed to an outside of the housing of the intake temperature sensor, where the heat sink is directly exposed to an intake flow flowing in the intake pipe, and the intake temperature sensors configured to output the temperature of the intake flow based on an output obtained from the temperature detecting element.

2. The intake temperature sensor according to claim 1, wherein
a wiring pattern is disposed on the heat sink, and
the temperature detecting element is electrically connected to the wiring pattern.

3. The intake temperature sensor according to claim 1, comprising:
an electronic circuit electrically connected to the temperature detecting element;
a circuit board on which the electronic circuit is mounted; and
the housing is configured to house the electronic circuit; wherein
a part of the heat sink is disposed in the housing, and
the temperature detecting element is fixed to the part of the heat sink disposed in the housing.

4. The intake temperature sensor according to claim 1, comprising:
an electronic circuit electrically connected to the temperature detecting element;
a circuit board on which the electronic circuit is mounted; and
the housing is configured to house the electronic circuit; wherein
the heat sink and the circuit board are composed of a same member.

5. The intake temperature sensor according to claim 1, wherein
the surface area of the heat sink is at least four times the surface area of the temperature detecting element.

6. The intake temperature sensor according to claim 1, wherein
the heat sink is composed of a material having a high thermal conductivity including at least one of metal or ceramic.

7. The intake temperature sensor according to claim 6, wherein
the material of the heat sink has a thermal conductivity of at least 1 W/m·k.

8. The intake temperature sensor according to claim 3, wherein
the housing employs a material having a small thermal conductivity including at least one of plastic, a polybutylene terephthalate resin, or a polyphenylene sulfide resin.

9. The intake temperature sensor according to claim 4, wherein
the housing employs a material having a small thermal conductivity including at least one of plastic, a polybutylene terephthalate resin, or a polyphenylene sulfide resin.

10. The intake temperature sensor according to claim 1, wherein
the heat sink is provided with a slit part.

11. The intake temperature sensor according to claim 10, wherein
the slit part is provided so as to surround a periphery of the temperature detecting element.

12. The intake temperature sensor according to claim 3, wherein
a recessed part is provided at a part of the housing of the intake temperature sensor, and the heat sink is disposed on the recessed part.

13. The intake temperature sensor according to claim 4, wherein
a recessed part is provided at a part of the housing of the intake temperature sensor, and the heat sink is disposed on the recessed part.

14. A thermal-type flowmeter having the intake temperature sensor according to claim 1, comprising:
an attachment part fixable to the intake pipe;
a connector part electrically connectable with an outside electrical connection;
a sub-passage taking in a part of a flow of the intake flow;
an air mass flow detecting element disposed in the sub-passage; and
the housing is configured to house a circuit board electrically connected to the temperature detecting element and the air mass flow detecting element; wherein
the temperature detecting element and the heat sink are disposed to the outside of the housing and outside the sub-passage, an integrated circuit for processing an output signal of the temperature detecting element and an output signal of the air mass flow detecting element, where the integrated circuit is provided on the circuit board, and the air mass flow of the intake is detected based on the output signal of the air mass flow detecting element.

* * * * *